(12) United States Patent
Kondo et al.

(10) Patent No.: US 8,507,130 B2
(45) Date of Patent: Aug. 13, 2013

(54) WATER BASED LITHIUM SECONDARY BATTERY

(75) Inventors: Hiroki Kondo, Nisshin (JP); Tsuyoshi Sasaki, Aichi-gun (JP); Osamu Hiruta, Nagoya (JP); Yuichi Itou, Toyota (JP); Chikaaki Okuda, Nagoya (JP); Youji Takeuchi, Seto (JP); Yoshio Ukyo, Seto (JP)

(73) Assignee: Kabushiki Kaisha Toyota Chuo Kenkyusho, Aichi (JP)

( * ) Notice: Subject to any disclaimer, the term of this patent is extended or adjusted under 35 U.S.C. 154(b) by 696 days.

(21) Appl. No.: 12/452,115

(22) PCT Filed: Jun. 30, 2008

(86) PCT No.: PCT/JP2008/061844
§ 371 (c)(1),
(2), (4) Date: Dec. 16, 2009

(87) PCT Pub. No.: WO2009/008280
PCT Pub. Date: Jan. 15, 2009

(65) Prior Publication Data
US 2010/0136427 A1    Jun. 3, 2010

(30) Foreign Application Priority Data

Jul. 11, 2007  (JP) ................. 2007-182406

(51) Int. Cl.
*H01M 10/0563* (2010.01)
*H01M 10/0561* (2010.01)
*H01M 10/056* (2010.01)
*H01M 10/36* (2010.01)

(52) U.S. Cl.
USPC ........................... 429/188; 429/207

(58) Field of Classification Search
USPC .................................. 429/188, 347
See application file for complete search history.

(56) References Cited

U.S. PATENT DOCUMENTS 2,814,664 A * 11/1957 Ruben ............. 429/133
5,151,335 A *  9/1992 Ryan .............. 429/223

(Continued)

FOREIGN PATENT DOCUMENTS

| JP | A-9-508490 | 8/1997 |
| JP | A-2000-77073 | 3/2000 |

(Continued)

OTHER PUBLICATIONS

Wang et al.; "Electrochemical properties of.$TiP_2O_7$ and $LiTi_2(PO_4)_3$ as anode material for lithium ion battery with aqueous solution electrolyte;" *Electrochimica Acta*; 2007; pp. 3280-3285; vol. 52; No. 9.

(Continued)

*Primary Examiner* — Jonathan Crepeau
*Assistant Examiner* — Jacob Buchanan
(74) *Attorney, Agent, or Firm* — Oliff & Berridge, PLC (57) ABSTRACT

The present invention provides a water based lithium secondary battery that can inhibit deteriorations in capacity owing to charge-and-discharge operations and maintain a high capacity even after it is charged and discharged repeatedly. The water based lithium secondary battery includes a positive electrode, a negative electrode, a separator 4 sandwiched between these, and an aqueous electrolyte solution obtained by dissolving an electrolyte made of a lithium salt in a water based solvent. As the water based solvent, a pH buffer solution is employed. The buffer solution is obtained by dissolving an acid and its conjugate base's salt, a base and its conjugate acid's salt, a salt made from a weak acid and a strong base, a salt made from a weak base and a strong acid, or a salt made from a weak acid and a weak base in water.

10 Claims, 2 Drawing Sheets

(56) References Cited

U.S. PATENT DOCUMENTS

| | | | |
|---|---|---|---|
| 2004/0265688 A1* | 12/2004 | Arao et al. | 429/176 |
| 2005/0064288 A1* | 3/2005 | Ivanov et al. | 429/188 |
| 2008/0038635 A1* | 2/2008 | Sheem et al. | 429/212 |
| 2008/0222881 A1* | 9/2008 | Yu et al. | 29/623.1 |

FOREIGN PATENT DOCUMENTS

| | | |
|---|---|---|
| JP | A-2000-340256 | 12/2000 |
| JP | A-2001-102086 | 4/2001 |
| JP | A-2002-110221 | 4/2002 |
| JP | A-2002-260722 | 9/2002 |
| JP | A-2003-17057 | 1/2003 |
| JP | A-2003-173814 | 6/2003 |
| JP | A-2004-349079 | 12/2004 |
| JP | A-2004-362837 | 12/2004 |
| JP | A-2006-12544 | 1/2006 |
| JP | A-2006-73259 | 3/2006 |
| JP | A-2006-147287 | 6/2006 |
| WO | WO 95/21470 | 8/1995 |

OTHER PUBLICATIONS

Wang et al.; "Stabilizing Cyclability of an Aqueous Lithium-Ion Battery LiNi$_{1/3}$Mn$_{1/3}$Co$_{1/3}$O$_2$/Li$_x$V$_2$O$_5$ by Polyaniline Coating on the Anode;" *Electrochemical and Solid-State Letters*; 2007; pp. A199-A203; vol. 10; No. 9.

International Search Report for International Application No. PCT/JP2008/061844, issued Jul. 29, 2008.

International Preliminary Report on Patentability for International Application No. PCT/JP2008/061844, issued Feb. 4, 2010.

Written Opinion of the International Searching Authority for International Application No. PCT/JP2008/061844, issued Feb. 4, 2010.

Nov. 13, 2012 Office Action issued in Japanese Patent Application No. 2009-522583 (with translation).

\* cited by examiner

WATER BASED LITHIUM SECONDARY BATTERY

TECHNICAL FIELD

The present invention relates to a water based lithium secondary battery containing as its electrolyte solution an aqueous electrolyte solution obtained by dissolving lithium salt in a water based solvent.

BACKGROUND ART

The lithium secondary battery using a non-water based electrolyte solution has been already put to practical use in the related fields of information-communication devices such as personal computers and cellular phones because this type of battery can give high-voltage and high-energy densities with a reduced size and weight. Further, the lithium secondary battery is expected to find further applications as a power supply mounted in an electric vehicle or a hybrid electric vehicle in order to accommodate the problems of resources and environments.

Generally, a non-water based lithium secondary battery is constituted by combining a lithium transition metal composite oxide as its positive electrode active material, a carbon material as its negative electrode active material, and an non-aqueous electrolyte solution obtained by dissolving lithium salt in an organic solvent.

There is another type of water based lithium secondary battery available that uses an aqueous solution as its electrolyte solution. The water based lithium secondary battery does not need dry environments in its manufacturing process in contrast to the non-water based lithium secondary battery and so can reduce the manufacturing costs significantly. Further, the aqueous electrolyte solution generally has higher conductivity than the non-water based electrolyte solution, so that the water based lithium secondary battery has an advantage of lower internal resistance than that of the non-water based lithium secondary battery.

On the other hand, however, the water based lithium secondary battery is required to be used in a potential region in which water will not electrolyzed and so has smaller electromotive force than the non-water based lithium secondary battery.

As calculated from the electrolysis voltage of water, the electromotive force is about 1.2V at the maximum but, in reality, expected to be about 2V at the maximum because an over-voltage is necessary to give rise to a gas in electrolysis.

Thus, the water based lithium secondary battery can reduce the costs and the internal resistance at the cost of high voltage densities, that is, high energy densities. Therefore, the water based lithium secondary battery is not suitable for use in the instruments such as cellular phones mainly required to be high in energy density, that is, light and small but may be expected to be suited for use as a power supply in the electric vehicles and hybrid electric vehicles and, furthermore, as a household-purpose dispersed power supply, which are relatively put importance on costs and required to be large scaled.

What is important in constitution of the water based lithium secondary battery is to use an active material that can reversibly absorb and desorb a lot of lithium stably in an aqueous solution and in a potential region in which neither oxygen nor hydrogen will be produced in the electrolysis of water, that is, an active material that can give a large capacity in a specific potential region.

Further, the electrolyte solution to be used should desirably be neutral through alkaline. This is because generally the Li containing oxides mainly used as the active material lack in stability in a strongly acidic aqueous solution and, further, a lot of $H^+$ ions in the acid electrolyte solution may possibly inhibit the rocking chair reaction of pure $Li^+$ ions.

So far, as the positive electrode active material used in water based lithium secondary batteries, $LiMn_2O_4$, $LiFePO_4$, etc. have been proposed (see Patent Documents 1 to 3). These positive electrode active materials are comparatively stable in an aqueous solution and can realize a comparatively large capacity.

On the other hand, as the negative electrode active material, manganese oxides, iron oxides, iron oxide hydroxides, vanadium oxides, titanium based polyanion compounds, etc. have been proposed (see Patent Documents 3 to 8).

Among these, the vanadium oxides are considered to be most promising as the negative electrode active material used in the water based lithium secondary battery. In particular, $LiV_2O_4$ having the spinel structure can realize a comparatively large capacity in an aqueous electrolyte solution because it can stably bring about reversible insertion and absorption of Li in the potential region in which water will not be electrolyzed.

In such a water based lithium secondary battery, its positive and negative electrodes are generally formed in a condition where the positive and negative electrode active materials are supported on current collectors made of aluminum or nickel etc.

Further, as the electrolyte solution, it has been proposed to use an aqueous solution of a lithium salt such as lithium sulfate, lithium chloride, lithium acetate, or lithium nitrate (see Patent Document 9 and Non-patent Document 1).

Patent Document 1: Published Japanese translation of PCT international application No. Hei 9-508490

Patent Document 2: Japanese Patent Application Laid-Open No. 2002-260722

Patent Document 3: Japanese Patent Application Laid-Open No. 2002-110221

Patent Document 4: Japanese Patent Application Laid-Open No. 2000-340256

Patent Document 5: Japanese Patent Application Laid-Open No. 2000-77073

Patent Document 6: Japanese Patent Application Laid-Open No. 2001-102086

Patent Document 8: Japanese Patent Application Laid-Open No. 2003-17057

Non-patent Document 1: H. Wang et al. "Electrochimica Acta", Britain, issued on Feb. 15, 2007, Vol. 52, No. 9, p. 3280-3285

DISCLOSURE OF THE INVENTION

Problems to be Solved by the Invention

However, the past water based lithium secondary batteries deteriorate significantly through charge and discharge operations and lack in cycle stability. That is, they have had a problem in that their capacity decreases readily through the repetitions of the charge-and-discharge operation.

As a result of analysis on the reason why the capacity deteriorates through the charge and discharge operations, it was found that the main factor was the corrosion of a current collector and the deterioration of active materials owing to a variation in pH value of the electrolyte solution.

That is, as the electrolyte solution, the water based lithium secondary battery uses such a comparatively neutral aqueous solution as to have, for example, a pH value of 3 to 11, in which electrolyte solution its pH value readily changes significantly even if only an extremely small amount of an impurity is mixed. Moreover, in such an aqueous electrolyte solution, its pH value may possibly change significantly even if, for example, an extremely small amount of water is electrolyzed or metal ions are eluted from the electrodes as the charge and discharge operations go on.

On the other hand, in the potential region of the water based lithium secondary battery, metals such as aluminum or nickel used as the material of the current collectors are difficult to exist as metals and so coated with a passive state film on the metal surface. The passive state film can inhibit the current collectors from being corroded further and enables the current collectors to maintain their own functions as current collectors in the water based lithium secondary battery.

However, as described above, if the pH value of the aqueous electrolyte solution shifts to acidity or alkalinity significantly, the current collectors may possibly be corroded. That is, the current collectors made of, for example, Ni etc. may possibly have been corroded if the pH value of the aqueous electrolyte solution shifts to acidity significantly. Further, the current collectors made of Al etc. may possibly have been corroded even if the pH value shifts either to acidity or alkalinity significantly. Such corrosion of the current collectors has broken down the balance in capacity between the positive and negative electrodes, thus causing deteriorations in capacity. Moreover, the corrosion of the current collectors has reduced conductivity of the electrodes, thus causing an increase in resistivity. If corrosion occurs, a variation in pH value increases further, this could accelerate the corrosion.

There has been another problem in that a variation in pH value accelerates the electrolysis of the aqueous electrolyte solution and the elution of ions from the positive electrode and/or the negative electrode and also the deterioration of the capacity.

In view of the problems in the past, the present invention has been developed, and it is an object of the present invention to provide a water based lithium secondary battery that can inhibit deteriorations in capacity owing to charge and discharge operations and maintain a high capacity even after the charge and discharge operation is repeated.

Means for Solving the Problems

The present invention provides a water based lithium secondary battery characterized by comprising a positive electrode, a negative electrode, and an aqueous electrolyte solution obtained by dissolving an electrolyte made of a lithium salt in a water based solvent, wherein a variation in pH value of the aqueous electrolyte solution after a charge and discharge operation is repeated 20 cycles at a temperature of 20° C. is controlled to ±0.5 or less.

In the water based lithium secondary battery of the present invention, the variation in pH value of the aqueous electrolyte solution after the charge and discharge operation is repeated 20 cycles at the temperature of 20° C. is controlled in a very small range of ±0.5 or less. Therefore it is possible to inhibit current collectors from being corroded and the positive and negative electrodes from being deteriorated during the charge and discharge operations. As a result, the water based lithium secondary battery is inhibited from being deteriorated in capacity owing to charge and discharge operations and so can maintain a large capacity even after the charge and discharge operation is repeated.

BRIEF DESCRIPTION OF THE INVENTION

BEST MODE FOR CARRYING OUT THE INVENTION

A description will be given of preferred embodiments of the present invention.

As described above, in the aqueous electrolyte solution, a variation in pH value after the water based lithium secondary battery is charged and discharged, for example, 20 times is 0.5 or less, preferably 0.2 or less, and more preferably 0.1 or less. If the variation in pH value exceeds 0.5, the current collectors may possibly be corroded or ions may possibly be eluted from the positive or negative electrode. The variation in pH value should as described above be 0.5 or less, 0.2 or less, or 0.1 or less after the charge and discharge operation is performed preferably 50 times, or more preferably, even 100 times.

In particular, in a cylinder shaped water based lithium secondary battery, the variation in pH value of the aqueous electrolyte solution after it is charged and discharged at least 50 times is preferably ±0.5 or less, while in a coin shaped water based lithium secondary battery, the variation in pH value of the aqueous electrolyte solution after it is charged and discharged at least 20 times is preferably ±0.5 or less.

More preferably, in the water based lithium secondary battery, the variation in pH value of the aqueous electrolyte solution after it is charged and discharged 200 cycles at the temperature of 20° C. is controlled in the range of ±0.5 or less.

In this case, it is possible to inhibit the current collectors from being corroded and the ions from being eluted from the positive or negative electrode. Further, preferably the variation in pH value after it is charged and discharged 200 cycles is ±0.2 or less or more preferably ±0.1 or less.

Next, a pH buffer solution is preferably employed as the aqueous electrolyte solution.

In this case, it is possible to easily realize the water based lithium secondary battery in which the variation in pH value of the aqueous electrolyte solution after the charge and discharged operation is repeated at the temperature of 20° C. is controlled in the range of ±0.5 or less.

The aqueous electrolyte solution made of a pH buffer solution can be obtained, for example, by dissolving an electrolyte made of a lithium salt into a buffer solution obtained by dissolving a substance having a buffering action into water.

Preferably the buffer solution is obtained by dissolving an acid and its conjugate base's salt, a base and its conjugate acid's salt, a salt made from a weak acid and a strong base, a salt made from a weak base and a strong acid, or a salt made from a weak acid and a weak base into water.

In this case, it is possible to easily prepare the buffer solution having the buffering action.

The possible combination of the acid and its conjugate base's salt may be, for example, a weak acid and a salt made from this weak acid and a strong base. Further, the possible combination of the base and its conjugate acid's salt may be, for example, a weak base and a salt made from this weak base and a strong acid.

This weak acid has a $pK_a$ value of 3.0 to 11.0 at a temperature of 25° C. and this weak base has a $pK_b$ value of 3.0 to 11.0 at the temperature of 25° C. Further, this strong acid has a $pK_a$ value of 0 to 2.0 at the temperature of 25° C. and this strong base has a $pK_b$ value of 0 to 2.0 at the temperature of 25° C.

It is to be noted that $K_a$ is the dissociation constant of acids and $K_b$ is the dissociation constant of bases and they have relationships of $pK_a = -\log K_a$ and $pK_b = -\log K_b$ respectively.

The weak acids used may be at least one selected from a group of, for example, a citric acid, an acetic acid, a phthalic acid, a succinic acid, a maleic acid, a phosphoric acid, a boric acid, a carbonic acid, etc. The strong base may employ, for example, a hydroxide of an alkali metal or an alkali earth metal.

Therefore, the possible combination of the acid and its conjugate base's salt may employ, for example, a weak acid and a salt made from the same kind of acid as this weak acid and an alkali metal or alkali earth metal. Further, the possible salt used made from weak acid and strong base may be, for example, a salt made from the above-enumerated weak acid and alkali metal or alkali earth metal.

More preferably, the buffer solution contains a potassium salt.

In this case, the conductivity increases, to enable decreasing the pure resistance. Further, in this case, the solution contains potassium ions whose radius is sufficiently larger than lithium ions, so that the potassium ions hardly compete against the insertion/desorption reaction of Li during charge and discharge operation, thus enabling further inhibiting deteriorations in cycling characteristics of the battery. In contrast to this, Na has an ion radius comparatively close to Li and may possibly compete against the insertion/desorption reaction of Li, so that preferably the buffer solution does not contain Na salts.

Further, the weak base used may be an ammonia and/or amine compound. The amine compound may specifically be a tris (hydroxymethyl) aminomethane, diethanolamine, a triethanolamine, etc. The strong acid may be, for example, at least one of a group including a sulfuric acid, a nitric acid, a hydrochloric acid, etc.

Therefore, the possible base and its conjugate acid's salt used may employ, for example, any one of those weak bases and a salt made from the same kind of base as this weak base and any one of the strong acid. Further, the possible salt used made from weak base and strong acid may employ, for example, a salt made from the above-enumerated weak acid and alkali metal or alkali earth metal.

Further, as the salt made from the weak acid and the weak base also, it is possible to employ the salt made from, for example, the above-enumerated weak acids and the weak bases.

As exemplified by the combinations, by preparing an acid and its conjugate base's salt, a base and its conjugate acid's salt, a salt made from a weak acid and a strong base, a salt made from a weak base and a strong acid, or a salt made from a weak acid and a weak base, the buffer solution having the excellent buffering actions can be given.

Preferably the buffer solution contains a potassium acetate and an acetic acid. Specifically, as the buffer solution, an aqueous solution can be employed which contains a potassium acetate and an acetic acid.

In this case, it is possible to further improve the cycling characteristics of the water based lithium secondary battery. The possible reason may be that acetic acids are stable in the service potential region of the battery.

Preferably the mixture ratio between the potassium acetate and the acetic acid in the buffer solution is 7 to 10:3 to 0 in terms of molar ratio.

If the mixture ratio goes out of this range, the pH value decreases so that the current collectors made of aluminum etc. or the active materials may be easily damaged. By controlling the mixture ratio in this range, the buffering ability of the buffer solution can be realized at a relatively high pH value. It is thus possible to inhibit the current collectors and the active materials from being damaged, thus improving the cycling characteristics.

Specific means to control a variation in pH value of the aqueous electrolyte solution in the range of ±0.5 or less may be, besides the above-described method of adding a pH buffering agent, a method of coating the positive electrode and/or the active materials, a method of coating the electrodes, a method of forming functional group that absorbs an impurity or reacts with it on a separator, a method of circulating an electrolyte solution to supply the inside of the battery system with an aqueous electrolyte solution having a predetermined pH value, etc.

Further, preferably this aqueous electrolyte solution has a pH value of 3 to 11 at a temperature of 25° C.

That is, preferably this aqueous electrolyte solution exhibits the buffering action in this pH range of 3 to 11 at the temperature of 25° C.

If the pH value of the aqueous electrolyte solution is less than 3, the chemical reaction due to the acid aqueous solution may possibly cause Li to be desorbed from the positive electrode and/or the negative electrode so that the water based lithium secondary battery could not maintain its battery voltage. Further, in this case, protons in the aqueous electrolyte solution may possibly inhibit insertion/desorption of Li. On the other hand, if the pH value exceeds 11, for example, the current collectors may possibly be corroded at the positive electrode and the negative electrode of the water based lithium secondary battery. Preferably, the pH value in this aqueous electrolyte solution is 4.0 to 9.

The lithium salt used may be, for example, $LiNO_3$, LiOH, LiCl, etc. Those lithium salts can be used alone each or in combination.

Preferably the lithium salt is a lithium nitrate.

In this case, it is possible to obtain a high charging-and-discharging efficiency without little side reactions.

Preferably the concentration of the lithium salt as the electrolyte in the aqueous electrolyte solution is at least 0.1 mol/l and not larger than a saturation concentration.

If the lithium salt concentration is less than 0.1 mol/l, the solution runs short of Li and may possibly decrease its power. On the other hand, if the lithium salt concentration exceeds its saturated value, the concentration is distributed by charging and discharging to deposit the salt in the electrodes or the separator, thereby blocking off the passage of Li ions or damaging the electrodes or the separator.

Further preferably, the buffer solution and the lithium salt as the electrolyte are selected from those materials that do not react with each other chemically. If a chemical reaction occurs between the two, a deposit may possibly be formed, thus deteriorating the buffering action.

Next, the positive electrode can be formed by mixing, for example, a positive electrode active material with a conducting or binding material, adding an appropriate solvent to it as necessary so that it may become in pasted form, applying this positive-electrode admixture in paste form onto the surface of the positive electrode current collector made of a stainless steel (SUS) mesh, an aluminum foil, a nickel foil, etc. and drying it, and compressing it so as to increase the electrode density as necessary.

As the positive electrode active material, any one of various positive electrode active materials publicly known at the time of filing of the present application can be employed. The positive electrode active material used may be, for example, a compound such as a polyanion compound or an oxide containing at least one transition metal selected from a group including, nickel, cobalt, manganese, iron, vanadium, molybdenum, tungsten, etc.

Preferably the positive electrode active material has as its main component a compound having the olivine structure, the spinel structure, or the layer structure.

In this case, it is possible to increase the stability of the positive electrode active material, thus improving the charging-and-discharging efficiency of the water based lithium secondary battery.

Preferably the positive electrode has a olivine-structured compound having a basic composition of $LiFePO_4$ as its positive electrode active material.

In this case, the water based lithium secondary battery can have more remarkable inhibiting effects on the above-described capacity deteriorations by using the buffer solution. It is to be noted that the expression of "having . . . as its basic composition" means to include not only what is given by the concerned composition formula but also what is obtained by replacing some of the sites such as Li and Fe in the crystal structure with any other elements. It further means to include not only those with a stoichiometric composition but also those with nonstoichiometric composition having some of the elements lost, for example.

Further, as the positive electrode active material, a lithium-manganese composite oxide, a lithium-nickel composite oxide, etc. can also be used.

The conducting material is used to preserve the electrical conductivity of the positive electrode, coming in one or a mixture of powdered carbonaceous substances such as carbon black, acetylene black, natural graphite, artificial graphite, and coke.

The binding material used serves to bind active material particles and conducting material particles, coming in, for example, a fluoric resin such as polytetrafluoroethylene, polyvinylidene-fluoride, fluoric rubber, or a thermoplastic resin such as polypropyrene, polyethylene, polyethylene-terephthalate, or a polyacrylonitrile-based macro molecule. Further, the binding material used may be a water based binder such as cellulose-based binder or a water dispersible substance of stylene-butadiene rubber.

The possible solvent to disperse such active materials, conducting materials, and binding materials may be, for example, water or an organic solvent such as N-methyl-2-pyrolidone.

On the other hand, like the positive electrode, the negative electrode can be formed by mixing, for example, a negative electrode active material with a conducting or binding material, adding an appropriate solvent to it as necessary so that it may become in pasted form, applying this negative-electrode admixture in paste form onto the surface of the negative electrode current collector made of, for example, a stainless steel (SUS) mesh, an aluminum foil, or a nickel foil and drying it, and compressing it so as to increase the electrode density as necessary.

The negative electrode active material used may be, for example, a polyanion compound or an oxide or hydroxide containing at least one transition metal element selected from a group including manganese, iron, vanadium, and titanium. Further, it may also be a composite oxide etc. of lithium and those transition metal elements. More specifically, $VO_2$ etc. can be used as the oxide of vanadium and $LiV_3O_8$, $LiV_2O_4$, etc. can be used as the composite oxide of vanadium and lithium.

Preferably this negative electrode has a spinel-structured compound having a basic composition of $LiV_2O_4$ as its negative electrode active material.

In this case, this battery can have more remarkable inhibiting effects on the above-described capacity deteriorations by using the buffer solution. It is to be noted that the expression of "having . . . as its basic composition" means to include not only what is given by the concerned composition formula but also what is obtained by replacing some of the sites such as Li and V in the crystal structure with any other elements. It further means to include not only those with a stoichiometric composition but also those with nonstoichiometric composition having some of the elements lost, for example.

The conducting material used as mixed with the negative electrode active material may be a powdered carbonaceous substance similar to the case of the positive electrode. On the other hand, the binding material used may be a fluorine-containing resin, a thermoplastic resin, a polyacrylonitrile-based macro molecule, or a water based binder similar to the case of the negative electrode. The possible solvent to disperse the negative electrode active material, the conducting material, and the binding material may be, for example, water or an organic solvent such as N-methyl-2-pyrolidone.

Further, a separator can be sandwiched between the positive electrode and the negative electrode. This separator can separate the positive and negative electrodes from each other and hold an aqueous electrolyte solution.

Preferably the separator is made of a porous body.

In this case, the separator can be impregnated sufficiently with the aqueous electrolyte solution.

The possible separator used may be a thin micro-porous membrane made of, for example, cellulose, polyacrylonitrile, polyethylene, or polypropylene.

Further, the water based lithium secondary battery may be shaped like, for example, a coin, a cylinder, a rectangle, etc. A battery case corresponding to any one of these shapes can be used to house the positive and negative electrodes, the separator, the aqueous electrolyte solution, etc.

This water based lithium secondary battery can be manufactured by, for example, housing an electrode body in which the separator is sandwiched between these positive electrode and negative electrode in the battery case having a predetermined shape, electrically connecting the positive electrode current collector and the negative electrode current collector to an external positive-electrode terminal and an external negative-electrode terminal via lead wires respectively, impregnating this electrode body with the aqueous electrolyte solution, and sealing the battery case.

EXAMPLES

Example 1

Next, a description will be given of an example of the present invention with reference to FIG. 1.

In the present example, a water based lithium secondary battery was made and its characteristics were evaluated.

Figure 1:
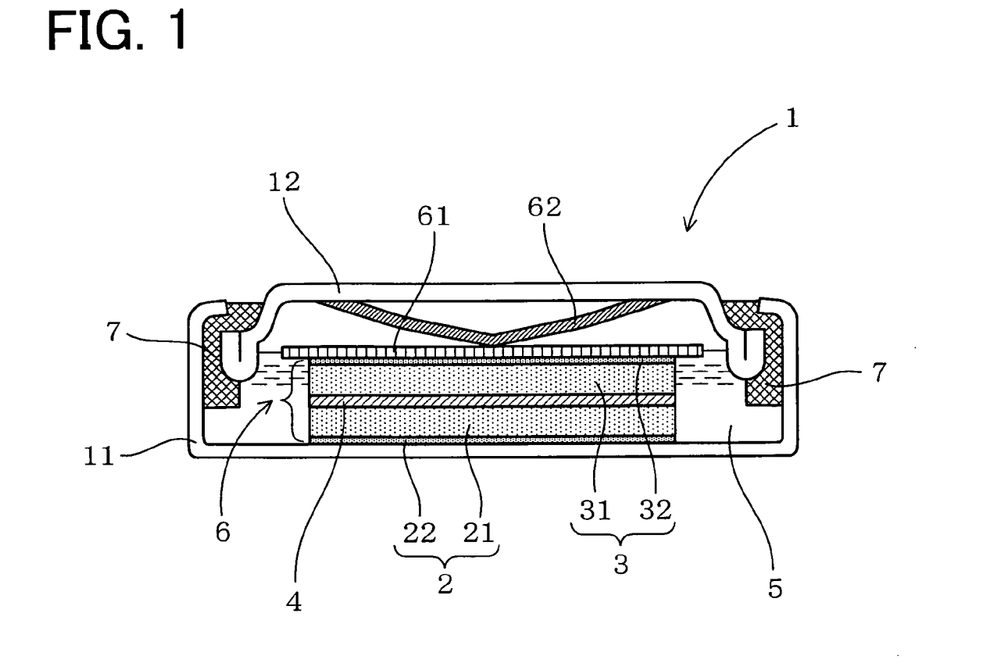
FIG. 1 is an explanatory diagram showing a structure of a water based lithium secondary battery according to a first embodiment.

As shown in FIG. 1, a water based lithium secondary battery 1 of the present example includes a positive electrode 2, a negative electrode 3, a separator 4 sandwiched between these, and an aqueous electrolyte solution 5 obtained by dissolving an electrolyte made of a lithium salt into a water based solvent. As the water based solvent to dissolve the electrolyte therein, a pH buffer solution has been employed.

In the present example, the positive electrode 2 is supposed to use $LiFePO_4$ as its positive electrode active material and the negative electrode 3, $LiV_2O_4$ as its negative electrode active material. The positive electrode 2 is formed by applying a positive electrode admixture 21 containing the positive electrode active material onto a positive electrode current collector (aluminum foil-made current collector) 22. On the other hand, the negative electrode 3 is formed by applying a negative electrode admixture 31 onto a negative electrode current collector (aluminum foil-made current collector) 32.

In the water based lithium secondary battery 1 of the present example, the stacked electrode body 6 formed by stacking the positive electrode 2, the negative electrode 3, and the porous separator 4 on one another is disposed in the type 2032 battery case 11. In the stacked electrode body 6, the separator 4 is disposed between the positive electrode 2 and the negative electrode 3 to separate the positive electrode 2 and the negative electrode 3 from each other. Further, the positive electrode 2 and the negative electrode 3 are stacked in a condition where their current collectors 22 and 32 face outward respectively.

Further, the battery case 11 is filled with the aqueous electrolyte solution 5. The aqueous electrolyte solution 5 is prepared by dissolving an electrolyte of $LiNO_3$ with a concentration of 6 mol/l into an aqueous solvent of 1 M acetic buffer solution.

At the end inside the battery case 11, a gasket 7 is disposed, while the battery case 11 is sealed with a sealing plate 12.

Further, in the water based lithium secondary battery of the present example, between the sealing plate 12 and a current collector plate 61 placed on the stacked electrode body 6, a plate spring 62 is disposed which is formed by folding back a SUS plate, so that the biasing force of the plate spring 62 fixes the stacked current collector body 5 in the battery case 11.

Next, a description will be given of a method of manufacturing the water based lithium secondary battery 1 of the present example.

First, $LiFePO_4$ was synthesized as the positive electrode active material as described below.

That is, first, lithium carbonate, iron oxalate in which the iron is divalent, and ammonium dihydrogenphosphate were mixed at a mole ratio of 1.2:1:1 (Li:Fe:P). Subsequently, the obtained mixed powder was formed in a pellet form and calcinated in an argon gas atmosphere at a temperature of 650° C. for 24 hours. Thus, $LiFePO_4$ was obtained. It is to be noted that the Li source (lithium carbonate) and the Fe source (iron oxalate) were mixed so that the obtained $LiFePO_4$ is to have a mole ratio of 1:1 (Li:Fe), whereas the mole ratio between Li and Fe is to be 1.2:1 in synthesis of $LiFePO_4$ as described above. This is because the inventor took into account the fact that Li would easily be released into the calcination atmosphere at a high temperature during compounding.

Next, $LiV_2O_4$ was synthesized as the negative electrode active material as described below.

First, lithium carbonate ($Li_2CO_3$) and vanadium pentoxide ($V_2O_5$) were weighed at such a stoichiometric ratio as to give a composition of $LiV_2O_4$ and mixed in an automatic mortar for 120 minutes. Subsequently, the mixture was press-formed and calcinated in a hydrogen stream at 700° C. for three hours. The obtained calcinated product was sufficiently pulverized in the mortar and then calcinated in an oxygen containing gas composed of carbon dioxide and oxygen at 650° C. for 48 hours. This calcinated product was further pulverized sufficiently in the mortar and then calcinated once more at 650° C. for 48 hours, thus obtaining spinel-structured $LiV_2O_4$. This was used as the negative electrode active material.

Next, the aqueous electrolyte solution was prepared as described below.

First, a 0.1 M solution of acetic acid and a 0.9 M solution of potassium acetate were mixed to prepare a 1 M acetic acid buffer solution (pH=5.0 (at 25° C.)). Subsequently, into this acetic acid buffer solution, $LiNO_3$ was dissolved in such a manner as to give a concentration of 6 M. Thus, the aqueous electrolyte solution (pH=4.70 (at 25° C.)) was obtained.

Next, a water based lithium secondary battery was prepared using the thus made positive electrode active material, the negative electrode active material, and aqueous electrolyte solution.

Specifically, first, 85 parts by weight of $LiFePO_4$ as the positive electrode active material, 8 parts by weight of carbon black as the conducting agent, and 7 parts by weight of polyacrylonitrile as the binding agent were mixed and an appropriate amount of N-methyl-2-pyrolidone as a dispersal material was added to it and dispersed in it, thus making a slurry-form positive electrode admixture. Subsequently, as shown in FIG. 1, the positive electrode admixture 21 was applied on one side of the 20 μm thick aluminum foil-made current collector 22 and dried. Then, it was plate-pressed so that it might be higher in density and carved out so that it might be shaped like a disk having a diameter of 16 mm as the positive electrode 2.

On the other hand, 85 parts by weight of $LiV_2O_4$ as negative electrode active material, 10 parts by weight of carbon black as the conducting agent, and 5 parts by weight of polyacrylonitrile as the binding agent were mixed and an appropriate amount of N-methyl-2-pyrolidone as a dispersal material was added to it and dispersed in it, thus making a slurry-form negative electrode admixture. Subsequently, as shown in FIG. 1, the negative electrode admixture 31 was applied on one side of the 20 μm thick aluminum foil-made current collector 32 and dried. Then, it was plate-pressed so that it is to be higher in density and carved out so that it is to be shaped like a disk having a diameter of 15 mm as the negative electrode 3.

Next, as shown in FIG. 1, the positive electrode 2, the negative electrode 3, and the polypropyrene-made separator 4 were stacked on one another to make the stacked electrode body 6. In this stacked electrode body 6, the separator 4 is disposed between the positive electrode 2 and the negative electrode 3 to separate the positive electrode 2 and the negative electrode 3 from each other. Further, the positive electrode 2 and the negative electrode 3 are stacked in a condition where their current collectors 22 and 32 face outward respectively.

Subsequently, the stacked electrode body 6 was disposed in the battery case 11 and the thus prepared aqueous electrolyte solution 5 was poured in it by an appropriate amount so that the separator 4 is to be impregnated with the aqueous electrolyte solution 5.

Further, the SUS-made current collector plate 61 was disposed on the stacked electrode body 6. The current collector plate 61 was placed on the current collector 32 of the negative electrode 3 in the stacked electrode body 6. Subsequently, the gasket 7 was disposed in the battery case 11 and, further, the sealing plate 12 was placed to an opening in the battery case 11. In this case, the plate spring 62 was disposed between the sealing plate 12 and the current collector plate 61 placed on the stacked electrode body 6, thereby fixing the stacked electrode body 6 in the battery case 11. Subsequently, the battery case 11 was sealed by caulking the ends of the battery case 11 and the sealing plate 12. Thus, the water lithium secondary battery 1 was manufactured. This is referred to as a battery E1. Table 1 shows the positive electrode active material, the negative electrode active material, the type of the Li salt, and the type and pH value of the buffer solution that were used to manufacture the battery E1.

Further, in the present example, seven types of water based lithium secondary batteries (batteries E2 to E8) were manufactured which used different positive electrode active material, negative electrode active material, and type of the buffer solution from those of the battery E1.

The battery E2 is a water based lithium secondary battery manufactured using a phthalic acid buffer solution having a concentration of 0.5 M as the buffer solution used as a water based solvent for the aqueous electrolyte solution.

That is, first, an acid potassium phthalate aqueous solution having a concentration of 0.5 M was prepared as a phthalic acid buffer solution (pH=4.5 (at 25° C.)) and $LiNO_3$ was dissolved in this phthalic acid buffer solution in such a manner as to give a concentration of 6 M, thereby preparing the aqueous electrolyte solution for the battery E2. Thus prepared aqueous electrolyte solution had a pH value of 3.97 (at 25° C.). Then, the thus prepared aqueous electrolyte solution was used along the same process as the battery E1 otherwise, thereby manufacturing a water based lithium secondary battery (battery E2).

That is, the battery E2 is the water based lithium secondary battery manufactured by the same way as the battery E1 except that it used the aqueous electrolyte solution having the phthalic acid buffer solution as the water based solvent. Table 1 shows the positive electrode active material, the negative electrode active material, the type of the Li salt, and the type and pH value of the buffer solution that were used to manufacture the battery E2.

The battery E3 is a water based lithium secondary battery manufactured using a succinic acid buffer solution having a concentration of 0.2 M as the buffer solution used as a water based solvent for the aqueous electrolyte solution.

That is, first, a succinic acid aqueous solution having a concentration of 0.2 M and a sodium hydroxide aqueous solution having a concentration of 0.2 M were mixed to give a succinic acid buffer solution (pH=5.0 (at 25° C.)) having a concentration of 0.2 M and, subsequently, $LiNO_3$ was dissolved in this succinic acid buffer solution in such a manner as to give a concentration of 6 M, thereby preparing the aqueous electrolyte solution for the battery E3. Thus prepared aqueous electrolyte solution had a pH value of 5.12 (at 25° C.). Then, the thus prepared aqueous electrolyte solution was used along the same process as the battery E1 otherwise, thereby manufacturing a water based lithium secondary battery (battery E3).

That is, the battery E3 is the water based lithium secondary battery manufactured by the same way as the battery E1 except that it used the aqueous electrolyte solution having the succinic acid buffer solution as the water based solvent. Table 1 shows the positive electrode active material, the negative electrode active material, the type of the Li salt, and the type and pH value of the buffer solution that were used to manufacture the battery E3.

The battery E4 is a water based lithium secondary battery manufactured using a boric acid buffer solution having a concentration of 0.4 M as the buffer solution used as a water based solvent for the aqueous electrolyte solution.

That is, first, a sodium borate aqueous solution having a concentration of 0.4 M was prepared as a boric acid buffer solution (pH=9.2 (at 25° C.)) and, subsequently, $LiNO_3$ was dissolved in this boric acid buffer solution in such a manner as to give a concentration of 6 M, thereby preparing the aqueous electrolyte solution for the battery E4. Thus prepared aqueous electrolyte solution had a pH value of 8.91 (at 25° C.). Then, the thus prepared aqueous electrolyte solution was used along the same process as the battery E1 otherwise, thereby manufacturing a water based lithium secondary battery (battery E4).

That is, the battery E4 is the water based lithium secondary battery manufactured by the same way as the battery E1 except that it used the aqueous electrolyte solution having the boric acid buffer solution as the water based solvent. Table 1 shows the positive electrode active material, the negative electrode active material, the type of the Li salt, and the type and pH value of the buffer solution that were used to manufacture the battery E4.

The battery E5 is a water based lithium secondary battery manufactured using an ammonium bicarbonate buffer solution having a concentration of 0.2 M as the buffer solution used as a water based solvent for the aqueous electrolyte solution.

That is, first, an ammonium bicarbonate aqueous solution having a concentration of 0.2 M was prepared as an ammonium bicarbonate buffer solution (pH=8.6 (at 25° C.)) and, subsequently, $LiNO_3$ was dissolved in this ammonium bicarbonate buffer solution in such a manner as to give a concentration of 6 M, thereby preparing the aqueous electrolyte solution for the battery E5. Thus prepared aqueous electrolyte solution had a pH value of 7.6 (at 25° C.). Then, the thus prepared aqueous electrolyte solution was used along the same process as the battery E1 otherwise, thereby manufacturing a water based lithium secondary battery (battery E5).

That is, the battery E5 is the water based lithium secondary battery manufactured by the same way as the battery E1 except that it used the aqueous electrolyte solution having the ammonium bicarbonate buffer solution as the water based solvent. Table 1 shows the positive electrode active material, the negative electrode active material, the type of the Li salt, and the type and pH value of the buffer solution that were used to manufacture the battery E5.

Further, the battery E6 is a water based lithium secondary battery manufactured using spinel-structured $LiMn_2O_4$ as the positive electrode active material.

The positive electrode active material ($LiMn_2O_4$) for the battery E6 was synthesized using the solid-phase method. First, lithium hydroxide (LiOH) and manganese dioxide ($MnO_2$) were mixed in such a manner as to give a mole ratio of 1.05:2.0 (Li:Mn) and underwent ball mill mixture by using an ethanol solvent for 24 hours. Subsequently, the obtained mixed powder was dried sufficiently and underwent dry ball mill mixture for 12 hours. Then, the mixed powder was calcinated in an oxygen atmosphere at a temperature of 800° C. for 12 hours. Thus, the spinel-structured $LiMn_2O_4$ was obtained. It is to be noted that the Li source (LiOH) and the Mn source ($MnO_2$) were mixed so that the obtained $LiMn_2O_4$ is to have a mole ratio of 1:2 (Li:Mn), whereas the mole ratio between Li and Mn is to be 1.05:2.0 in synthesis of $LiMn_2O_4$ as described above. This is because the inventor took into account the fact that Li would easily be released into the calcination atmosphere at a high temperature during compounding.

Next, the positive electrode was made in the same way as the battery E1 by using the positive electrode active material ($LiMn_2O_4$). That is, 85 parts by weight of $LiMn_2O_4$ as the positive electrode active material, 8.5 parts by weight of carbon black as the conducting agent, and 6.5 parts by weight of polyacrylonitrile as the binding agent were mixed and an appropriate amount of N-methyl-2-pyrolidone as a dispersal material was added to it and dispersed in it, thus making a slurry-form positive electrode admixture. Similar to the case of the battery E1, this positive electrode admixture was applied on one side of the 20 μm thick aluminum foil-made current collector and dried, then it was plate-pressed so that it is to be higher in density and carved out so that it is to be shaped like a disk having a diameter of 16 mm as the positive electrode.

Then, the thus made positive electrode was used along the same process as the battery E1 otherwise, thereby manufacturing a water based lithium secondary battery. This is referred to as the battery E6.

That is, the battery E6 is the water based lithium secondary battery manufactured by the same way as the battery E1 except that it used $LiMn_2O_4$ as the positive electrode active material. Table 1 shows the positive electrode active material, the negative electrode active material, the type of the Li salt, and the type and pH value of the buffer solution that were used to manufacture the battery E6.

The battery E7 is a water based lithium secondary battery manufactured using layer-structured $LiNi_{1/3}CO_{1/3}Mn_{1/3}O_2$ as the positive electrode active material.

The positive electrode active material ($LiNi_{1/3}CO_{1/3}Mn_{1/3}O_2$) for the battery E7 was synthesized in a process having two steps of manufacturing of mixed hydroxide by use of the co-precipitation method and calcination of LiOH and the mixed hydroxide.

First, nickel sulfate (II).hexahydrate ($NiSO_4.6H_2O$) cobalt sulfate (II).heptahydrate ($CoSO_4.7H_2O$), and manganese sulfate (II).pentahydrate ($MnSO_4.5H_2O$) were sufficiently dissolved into water at a stoichiometric ratio of the above composition formula ($LiNi_{1/3}CO_{1/3}Mn_{1/3}O_2$) in such a manner as to give 1 mol/l for each of these elements. Then, an NaOH aqueous solution and ammonium water were separately dropped into the aqueous solution until it has a pH value of 10.5, thus obtaining a mixed hydroxide of Ni, Co, and Mn. The obtained mixed hydroxide was washed sufficiently and dried at a temperature of 120° C. Subsequently, the lithium hydroxide.monohydrate ($LiOH.H_2O$) was mixed at the stoichiometric ratio of the above composition formula ($LiNi_{1/3}CO_{1/3}Mn_{1/3}O_2$). After being dried, the mixture was calcined in the air at a temperature of 500° C. for 10 hours and, further, calcinated at a temperature of 950° C. for 20 hours. Thus, the layer-structured $LiNi_{1/3}CO_{1/3}Mn_{1/3}O_2$ was obtained.

Next, the positive electrode was made in the same way as the battery E1 by using the positive electrode active material ($LiNi_{1/3}CO_{1/3}Mn_{1/3}O_2$). That is, 85 parts by weight of $LiNi_{1/3}CO_{1/3}Mn_{1/3}O_2$ as the positive electrode active material, 8.5 parts by weight of carbon black as the conducting agent, and 6.5 parts by weight of polyacrylonitrile as the binding agent were mixed and an appropriate amount of N-methyl-2-pyrolidone as a dispersal material was added to it and dispersed in it, thus making a slurry-form positive electrode admixture. Similar to the case of the battery E1, this positive electrode admixture was applied on one side of the 20 µm thick aluminum foil-made current collector and dried, then it was plate-pressed so that it is to be higher in density and carved out so that it is to be shaped like a disk having a diameter of 16 mm as the positive electrode.

Then, the thus made positive electrode was used along the same process as the battery E1 otherwise, thereby manufacturing a water based lithium secondary battery. This is referred to as the battery E7.

That is, the battery E7 is the water based lithium secondary battery manufactured by the same way as the battery E1 except that it used $LiNi_{1/3}CO_{1/3}Mn_{1/3}O_2$ as the positive electrode active material. Table 1 shows the positive electrode active material, the negative electrode active material, the type of the Li salt, and the type and pH value of the buffer solution that were used to manufacture the battery E7.

Further, the battery E8 is a water based lithium secondary battery manufactured using $TiP_2O_7$ as the negative electrode active material.

The negative electrode active material ($TiP_2O_7$) for the battery E8 was synthesized as follows. First, titanium oxide ($TiO_2$ (anatase)) was dispersed into a phosphoric acid ($H_3PO_4$) aqueous solution having a concentration of 85 wt %. Subsequently, it was dried at a temperature of 120° C. for 24 hours. Then, the obtained powder was calcinated in the air at a temperature of 800° C. for 12 hours. Thus, $TiP_2O_7$ was obtained. The obtained $TiP_2O_7$ was dispersed into water and sucrose was added to it in such a manner as to give a weight percentage between $TiP_2O_7$ and C of 90:10 ($TiP_2O_7$:C). It was cooled rapidly using liquefied nitrogen and dried by the freeze dry method. The obtained $TiP_2O_7$/sucrose powder was calcinated in an argon atmosphere at 700° C. for one hour, thus obtaining carbon-coated $TiP_2O_7$. This was used as the negative electrode active material.

Next, the negative electrode was made in the same way as the battery E1 by using the negative electrode active material ($TiP_2O_7$). That is, 85 parts by weight of $TiP_2O_7$ as the negative electrode active material, 8.5 parts by weight of carbon black as the conducting agent, and 6.5 parts by weight of polyacrylonitrile as the binding agent were mixed and an appropriate amount of N-methyl-2-pyrolidone as a dispersal material was added to it and dispersed in it, thus making a slurry-form negative electrode admixture. Similar to the case of the battery E1, this negative electrode admixture was applied on one side of the 20 µm thick aluminum foil-made current collector and dried, then it was plate-pressed so that it is to be higher in density and carved out so that it is to be shaped like a disk having a diameter of 15 mm as the negative electrode.

Then, the thus made negative electrode was used along the same process as the battery E1 otherwise, thereby manufacturing a water based lithium secondary battery. This is referred to as the battery E8.

That is, the battery E8 is the water based lithium secondary battery manufactured by the same way as the battery E1 except that it used $TiP_2O_7$ as the positive electrode active material. Table 1 shows the positive electrode active material, the negative electrode active material, the type of the Li salt, and the type and pH value of the buffer solution that were used to manufacture the battery E8.

Further, in the present example, four types of water based lithium secondary batteries (batteries C1 to C4) were manufactured so that they might be compared to the batteries E1 to E8.

The battery C1 is a water based lithium secondary battery manufactured using an aqueous electrolyte solution obtained by dissolving a Li salt ($LiNO_3$) into water without using a buffer solution.

That is, first, the aqueous electrolyte solution for the battery C1 was prepared by dissolving $LiNO_3$ into water in such a manner as to give a concentration of 6 M. The aqueous electrolyte solution (6M $LiNO_3$ aqueous solution) had a pH value of 4.65 at 25° C. Then, the thus prepared aqueous electrolyte solution was used along the same process as the battery E1 otherwise, thereby manufacturing a water based lithium secondary battery (battery C1).

The battery C1 is the water based lithium secondary battery manufactured by the same way as the battery E1 except that it used the aqueous electrolyte solution (6M $LiNO_3$ aqueous solution) prepared without using a buffer solution as described above. Table 1 shows the positive electrode active material, the negative electrode active material, and the type of the Li salt that were used to manufacture the battery C1.

The battery C2 is a water based lithium secondary battery manufactured by using an aqueous electrolyte solution obtained by dissolving a Li salt ($LiNO_3$) into water without using a buffer solution and also by using spinel-structured $LiMn_2O_4$ as the positive electrode active material as in the case of the battery E6.

That is, the aqueous electrolyte solution for the battery C2 was prepared by dissolving LiNO$_3$ into water in such a manner as to give a concentration of 6 M. The aqueous electrolyte solution had a pH value of 4.65 at 25° C. On the other hand, the positive electrode active material (LiMn$_2$O$_4$) for the battery C2 was made in the same way as the battery E6. Then, the prepared aqueous electrolyte solution (6M LiNO$_3$ aqueous solution) and positive electrode active material (LiMn$_2$O$_4$) were used along the same process as the battery E1 otherwise, thereby manufacturing a water based lithium secondary battery (battery C2).

The battery C2 is the water based lithium secondary battery manufactured by the same way as the battery E1 except that it used the aqueous electrolyte solution (6M LiNO$_3$ aqueous solution) prepared without using a buffer solution and also used spinel-structured LiMn$_2$O$_4$ as the positive electrode active material. Table 1 shows the positive electrode active material, the negative electrode active material, and the type of the Li salt that were used to manufacture the battery C2.

The battery C3 is a water based lithium secondary battery manufactured by using an aqueous electrolyte solution obtained by dissolving a Li salt (LiNO$_3$) into water without using a buffer solution and also by using layer-structured LiNi$_{1/3}$CO$_{1/3}$Mn$_{1/3}$O$_2$ as the positive electrode active material as in the case of the battery E7.

That is, the aqueous electrolyte solution for the battery C3 was prepared by dissolving LiNO$_3$ into water in such a manner as to give a concentration of 6 M. The aqueous electrolyte solution had a pH value of 4.65 at 25° C. On the other hand, the positive electrode active material (LiNi$_{1/3}$CO$_{1/3}$Mn$_{1/3}$O$_2$) for the battery C3 was made in the same way as the battery E7.

Then, the prepared aqueous electrolyte solution (6M LiNO$_3$ aqueous solution) and positive electrode active material (LiNi$_{1/3}$CO$_{1/3}$Mn$_{1/3}$O$_2$) were used along the same process as the battery E1 otherwise, thereby manufacturing a water based lithium secondary battery (battery C3).

The battery C3 is the water based lithium secondary battery manufactured by the same way as the battery E1 except that it used the aqueous electrolyte solution (6M LiNO$_3$ aqueous solution) prepared without using a buffer solution and also used layer-structured LiNi$_{1/3}$CO$_{1/3}$Mn$_{1/3}$O$_2$ as the positive electrode active material. Table 1 shows the positive electrode active material, the negative electrode active material, and the type of the Li salt that were used to manufacture the battery C3.

The battery C4 is a water based lithium secondary battery manufactured by using an aqueous electrolyte solution obtained by dissolving a Li salt (LiNO$_3$) into water without using a buffer solution and also by using TiP$_2$O$_7$ as the negative electrode active material as in the case of the battery E8.

That is, the aqueous electrolyte solution for the battery C4 was prepared by dissolving LiNO$_3$ into water in such a manner as to give a concentration of 6 M. The aqueous electrolyte solution had a pH value of 4.65 at 25° C. On the other hand, the negative electrode active material (TiP$_2$O$_7$) for the battery C4 was made in the same way as the battery E8. Then, the prepared aqueous electrolyte solution (6M LiNO$_3$ aqueous solution) and negative electrode active material (TiP$_2$O$_7$) were used along the same process as the battery E1 otherwise, thereby manufacturing a water based lithium secondary battery (battery C4).

The battery C4 is the water based lithium secondary battery manufactured by the same way as the battery E1 except that it used the aqueous electrolyte solution (6M LiNO$_3$ aqueous solution) prepared without using a buffer solution and also used TiP$_2$O$_7$ as the negative electrode active material. Table 1 shows the positive electrode active material, the negative electrode active material, and the type of the Li salt that were used to manufacture the battery C4.

TABLE 1

| battery No. | positive electrode active material | negative electrode active material | buffer solution type | pH (25° C.) | Li salt |
|---|---|---|---|---|---|
| E1 | LiFePO$_4$ | LiV$_2$O$_4$ | 1M acetic acid buffer solution | 5.0 | LiNO$_3$ (6M) |
| E2 | LiFePO$_4$ | LiV$_2$O$_4$ | 0.5M phthalic acid buffer solution | 4.0 | LiNO$_3$ (6M) |
| E3 | LiFePO$_4$ | LiV$_2$O$_4$ | 0.2M succinic acid buffer solution | 5.0 | LiNO$_3$ (6M) |
| E4 | LiFePO$_4$ | LiV$_2$O$_4$ | 0.4M boric acid buffer solution | 9.2 | LiNO$_3$ (6M) |
| E5 | LiFePO$_4$ | LiV$_2$O$_4$ | 0.2M ammonium bicarbonate buffer solution | 8.6 | LiNO$_3$ (6M) |
| E6 | LiMn$_2$O$_4$ | LiV$_2$O$_4$ | 1M acetic acid buffer solution | 5.0 | LiNO$_3$ (6M) |
| E7 | LiNi$_{0.33}$Co$_{0.33}$Mn$_{0.33}$O$_2$ | LiV$_2$O$_4$ | 1M acetic acid buffer solution | 5.0 | LiNO$_3$ (6M) |
| E8 | LiFePO$_4$ | TiP$_2$O$_7$ | 1M acetic acid buffer solution | 5.0 | LiNO$_3$ (6M) |
| C1 | LiFePO$_4$ | LiV$_2$O$_4$ | — | — | LiNO$_3$ (6M) |
| C2 | LiMn$_2$O$_4$ | LiV$_2$O$_4$ | — | — | LiNO$_3$ (6M) |
| C3 | LiNi$_{0.33}$Co$_{0.33}$Mn$_{0.33}$O$_2$ | LiV$_2$O$_4$ | — | — | LiNO$_3$ (6M) |
| C4 | LiFePO$_4$ | TiP$_2$O$_7$ | — | — | LiNO$_3$ (6M) |

Next, the thus manufactured 12 batteries (batteries E1 to E8 and batteries C1 to C4) were charged and discharged to measure their service capacity (initial capacity) and, further, subjected to the following charge-and-discharge cycle test to check on their post-cycle test capacity conservation ratio.

That is, first the batteries were charged to a predetermined upper limit voltage (charging stop voltage) shown in Table 2 below at a constant current having a current density of 0.1 mA/cm$^2$ and then discharged to a predetermined lower limit voltage (discharging stop voltage) shown in Table 2 below at a constant current having the current density of 0.1 mA/cm$^2$ at a temperature of 20° C. Then, the capacity upon discharge, that is, the service capacity (initial capacity) was measured. The service capacity was calculated by multiplying a discharge current value by a lapse of time required by the discharge. Table 2 shows the initial capacities of the respective batteries.

Next, in one cycle, the batteries were supposed to be charged to the predetermined upper limit voltage (charging stop voltage) shown in Table 2 below at the constant current having the current density of 0.1 mA/cm$^2$ and then discharged to the predetermined lower limit voltage (discharge stop voltage) shown in Table 2 below at the constant current having the current density of 0.1 mA/cm$^2$ at the temperature of 20° C.; with this, this cycle was performed 20 times repeatedly (charge-and-discharge cycle test). Then, the service capacity was measured upon the 20th cycle. Subsequently, a ratio (the 20th cycle service capacity/initial capacity) of the 20th cycle service capacity with respect to the initial capacity was expressed in percentage as a capacity conservation ratio. Table 2 below shows the capacity conservation ratios of the respective batteries.

Further, in the present example, the pH value of the aqueous electrolyte solution was measured before and after the charge-and-discharge cycle test was conducted for each of the batteries.

As the pH value (at 25 C.°) of the aqueous electrolyte solution before the charge-and-discharge cycle test, the following pH value was used for the aqueous electrolyte solution used to make each of the batteries. The results are shown in Table 2.

Further, the pH value (at 25 C.°) of the aqueous electrolyte solution for each of the batteries after the charge-and-discharge cycle test was measured by disassembling each battery after the charge-and-discharge cycle test was conducted and collecting the aqueous electrolyte solution. The results are shown in Table 2.

The pH value of the aqueous electrolyte solution was measured using a small-quantity specimen pH meter (B-212 made by Horiba Ltd.).

Further, in the present example, a change in color of the aqueous electrolyte solution was checked before and after the charge-and-discharge cycle test was conducted for each of the batteries.

The color of the aqueous electrolyte solution for each of the batteries before the charge-and-discharge cycle test was observed by performing visual inspection on the color thereof when the battery was manufactured as described above. As a result, it was found that the aqueous electrolyte solution was clear (colorless) for all of the batteries (batteries E1 to E8 and batteries C1 to C4).

On the other hand, the color of the aqueous electrolyte solution for each of the batteries after the charge-and-discharge cycle test was observed by performing visual inspection on the color thereof when the battery was disassembled after that test. The results are shown in Table 2 below.

TABLE 2

| battery No. | charging stop voltage (V) | discharging stop voltage (V) | initial capacity (mAh) | capacity conservation ratio of the 20th cycle (%) | change of pH value before cycle | change of pH value after cycle | color of the aqueous electrolyte solution after 20 cycle |
|---|---|---|---|---|---|---|---|
| E1 | 1.3 | 0.7 | 1.22 | 85.3 | 4.70 | 4.71 | clear |
| E2 | 1.3 | 0.7 | 1.18 | 76.5 | 3.97 | 3.97 | clear |
| E3 | 1.3 | 0.7 | 1.18 | 78.6 | 5.12 | 5.12 | clear |
| E4 | 1.3 | 0.7 | 1.21 | 80.2 | 8.91 | 8.76 | clear |
| E5 | 1.3 | 0.7 | 1.20 | 76.8 | 7.60 | 7.52 | clear |
| E6 | 1.8 | 1.0 | 0.73 | 56.1 | 4.70 | 4.70 | clear |
| E7 | 1.7 | 1.0 | 0.65 | 56.4 | 4.70 | 4.71 | clear |
| E8 | 1.3 | 0.7 | 0.45 | 81.2 | 4.70 | 4.70 | clear |
| C1 | 1.3 | 0.7 | 1.23 | 45.3 | 4.65 | 2.69 | pale yellow |
| C2 | 1.8 | 1.0 | 0.76 | 30.2 | 4.65 | 3.24 | black |
| C3 | 1.7 | 1.0 | 0.63 | 40.6 | 4.65 | 6.83 | pale yellow |
| C4 | 1.3 | 0.7 | 0.46 | 77.5 | 4.65 | 6.53 | clear |

As can be seen from comparison between the batteries E1 to E5 and C1, the batteries E6 and C2, the batteries E7 and C3, and the batteries E8 and C4 respectively in Table 2, the batteries E1 to E8 using the buffer solution in the aqueous electrolyte solution showed an inhibited variation in pH value before and after the charge-and-discharge cycle test and improved in capacity conservation ratio while maintaining almost the same degree of initial capacity as compared to the batteries C1 to C4 using no buffer solution.

Further, as can be seen from Table 2, effects were observed in improvement of the capacity conservation ratio owing to the buffer solution in the water based lithium batteries having various combinations of the positive electrode active material and the negative electrode active material. In particular, a significant increase was observed in capacity conservation ratio owing to use of the buffer solution, in the water based lithium secondary batteries (batteries E1 to E5 and battery C1) using LiFePO$_4$ as the positive electrode active material and LV$_2$O$_4$ as the negative electrode active material.

Further, as can be seen from the results of the batteries E1 to E5, effects were observed in improvement of the capacity conservation ratio even if different types of the buffer solution were used.

Further, for the batteries C1 to C3, the aqueous electrolyte solution was colored after the charge-and-discharge cycle test (see Table 2). Therefore, for the water based lithium secondary batteries using no buffer solution, it is considered that the pH value changed greatly of the aqueous electrolyte solution and metal ions and impurities etc. were eluted into the electrolyte solution from the positive electrode active material and/or the negative electrode active material etc., thus deteriorating the capacity conservation ratio.

In contrast, for the water based lithium secondary batteries (batteries E1 to E8) using the buffer solution, it is considered that a variation in pH value was inhibited before and after the charge-and-discharge cycle test, while at the same time the elution of the metal ions and impurities etc. into the electrolyte solution from the active materials was inhibited, thus resulting in an improvement in capacity conservation ratio.

As described above, according to the present example, it is possible to provide a water based lithium secondary battery (batteries E1 to E8) that can inhibit a deterioration in capacity owing to charge-and-discharge operations and also can have a large capacity even after the repeated charge-and-discharge operations.

Example 2

The present example examines a variation in pH value and the capacity conservation ratio after a water based lithium secondary battery was charged and discharged 100 times or 200 times repeatedly. In the examination by the present example, a cylinder-shaped water based lithium secondary battery was used.

Figure 2:
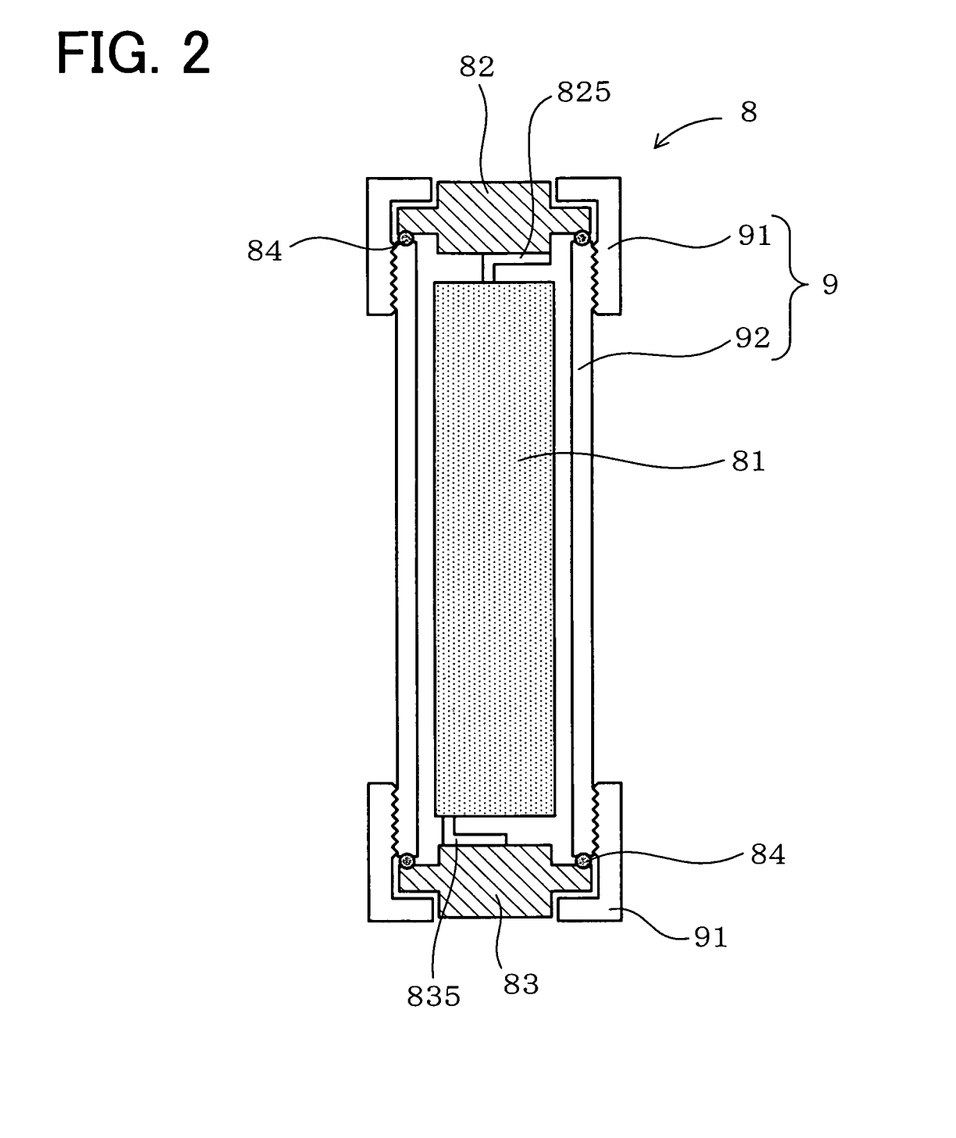
FIG. 2 is an explanatory diagram showing a structure of a water based lithium secondary battery according to a second embodiment.

As shown in FIG. 2, a water based lithium secondary battery 8 of the present example is cylinder-shaped and comprises a winder 81 around which a positive electrode, a negative electrode, and a separator are wound, a current collection cap 82, and a battery case 9, etc. The battery case 9 is comprised of a cap 91 and an external container 92. The external container 92 is roughly shaped like a cylinder. In the battery case 9, the sheet-shaped positive electrode and negative electrode are disposed as the winder 81 which they are wound around together with the separator sandwiched between them, thus forming a wound type electrode.

Further, inside the cap 91 of the battery case 9, the current collection caps 82 and 83 are disposed, to be electrically connected to the positive electrode and the negative electrode via current collection tabs 825 and 835 electrically conducted to the positive electrode and the negative electrode in the winder 8, respectively. Further, in an inner surface of the cap 91 of the battery case 9 and an outer surface of both ends of the exterior container 92, a screw groove is formed partially, so that the cap 91 and the exterior container 92 are screwed together in this screw groove and also fix the current collection caps 82 and 83 between the cap 91 and the cap 92.

Further, the battery case 9 is filled with an aqueous electrolyte solution obtained by dissolving an electrolyte made of a lithium salt into a water based solvent. As the water based solvent to dissolve the electrolyte therein, a pH buffer solution is employed as in the case of Example 1. Then, as shown in FIG. 2, an O-ring 84 is disposed between the end of the exterior container 92 and the current collection caps 82 and 83, thereby sealing the battery case 9.

In the manufacture of the water based lithium secondary battery 8 of the present example, first, LiFeO$_4$ was synthesized as the positive electrode active material as follows.

That is, first, lithium carbonate, iron oxalate in which the iron is divalent, and aluminum dihydrogenphosphate were mixed at a mole ratio of 1:1:1 (Li:Fe:P). Subsequently, the obtained mixed powder was formed in a pellet form and calcinated in an argon gas atmosphere at a temperature of 650° C. for 24 hours. Thus, LiFePO$_4$ was obtained. It was used as the positive electrode active material.

Next, LiV$_2$O$_4$ was synthesized as the negative electrode active material as described below.

First, as in the case of Example 1, lithium carbonate (Li$_2$CO$_3$) and vanadium pentoxide (V$_2$O$_5$) were weighed at such a stoichiometric ratio as to give a composition of LiV$_2$O$_4$ and mixed in an automatic mortar for 120 minutes. Subsequently, the mixture was press-formed and reduced in a hydrogen stream at 700° C. for 3 hours. The obtained calcinated product was sufficiently pulverized in the mortar and calcinated in an oxygen containing gas composed of carbon dioxide and oxygen at 650° C. for 48 hours. This calcinated product was further pulverized sufficiently in the mortar and then calcinated once more at 650° C. for 48 hours, thus obtaining spinel-structured LiV$_2$O$_4$. This was used as the negative electrode active material.

Next, the aqueous electrolyte solution was prepared as described below.

First, an acetic acid and a potassium acetate were dissolved into water in such a manner as to give concentrations of 0.1 M and 0.9 M respectively, thus preparing an acetic acid buffer solution (pH=5.0 (at 25° C.)). Subsequently, into this acetic acid buffer solution, LiNO$_3$ was dissolved in such a manner as to give a concentration of 6 M. Thus, the aqueous electrolyte solution (pH=4.70 (at 25° C.)) was obtained.

Next, a water based lithium secondary battery was prepared using the thus made positive electrode active material, the negative electrode active material, and aqueous electrolyte solution.

Specifically, first, 75 parts by weight of LiFePO$_4$ as the positive electrode active material, 9 parts by weight of carbon black as the conducting agent, and a total of 16 parts by weight of stylene butadiene rubber as the binding agent and carboxymethyl cellulose as a thickening agent were mixed and an appropriate amount of water as a dispersal material was added to it and dispersed in it, thus making a slurry-form positive electrode admixture. Subsequently, the positive electrode admixture was applied on both sides of a 20 μm thick aluminum foil-made current collector and dried. Then, it was roll-pressed so that it might be higher in density and carved out so that it is to be shaped like a sheet having a width of 56 mm and a length of 520 mm as the positive electrode.

Further, as in the case of Example 1, LiV$_2$O$_4$ was used as the negative electrode active material to prepare the slurry-form negative electrode admixture. Subsequently, the negative electrode admixture was applied on both sides of the 20 μm thick aluminum foil-made current collector and dried. Then, it was roll-pressed so that it is to be higher in density and carved out so that it is to be shaped like a sheet having a width of 54 mm and a length of 500 mm as the negative electrode.

Then, the positive electrode admixture was ground off partially from the end of the positive electrode where it was coated with the positive electrode admixture so that the final coating portion of the positive electrode admixture is to be 500 mm long. On the other hand, similarly, the final coating portion of the negative electrode admixture on the negative electrode was arranged to be 450 mm long.

Next, a current collection lead wire (not shown) was welded to each of the obtained sheet-shaped positive electrode 81 and negative electrode 82. Subsequently, the positive and negative electrodes were wound in a condition where the separator having a width of 58 mm and a thickness of 85 μm and made of a copolymer of polyethylene and polypropyrene is sandwiched between them, thereby making a spiral-shaped wound type electrode (winder 81).

Subsequently, the winder 81 was inserted into the cylindrical battery case 9 comprised of the exterior container 92 and the cap 91. In this case, in the battery case 9, the current collection lead wires were connected by welding to the current collection tabs 825 and 835 placed at the both ends of the winder 81 and also those current collection tabs 825 and 835 were connected to the Al-made current collection caps 82 and 83 placed at the both ends of the battery case, respectively. Further, in this case, an O-ring 84 was disposed between the end of the exterior container 92 and the current collection caps 82 and 83 to seal the inside of the battery case 9.

Next, the inside of the battery case 9 was impregnated with the aqueous electrolyte solution and the exterior container 92 and the cap 91 are screwed together in the screw groove to seal the battery case 9. Thus, the water based lithium secondary battery 8 was manufactured.

In the present example, as the cylinder type water based lithium secondary battery 8, 12 types of batteries (batteries E9 to E16 and batteries C5 to C8) were manufactured which have the same combinations of positive electrode active materials, the negative electrode active materials, buffer solutions, and Li salts as those shown in Table 1 for Example 1.

That is, the batteries E9 to E16 and the batteries C5 to C8 of the present example have the same combinations of the positive electrode active materials, the negative electrode active materials, the buffer solutions, and the Li salts as those of the batteries E1 to E8 and the batteries C1 to C4 of Example 1, respectively. They are shown in detail in Table 3.

charge-and-discharge cycle test was measured. In the present example, as in the case of Example 1, the pH values (at the temperature of 25° C.) of the aqueous electrolyte solution at the 100th cycle and 200th cycle were measured. The results are shown in Table 4. In Table 4, the pH value of the aqueous electrolyte solution before the charge and discharge operation is shown together. As the pH value (at 25 C.° of the aqueous electrolyte solution before the charge-and-discharge cycle test, the pH value of each aqueous electrolyte solution used to make each of the batteries.

Further, as in the case of Example 1, in the present example, a change in color of the aqueous electrolyte solution before

TABLE 3

| battery No. | positive electrode active material | negative electrode active material | buffer solution type | pH (25° C.) | Li salt |
|---|---|---|---|---|---|
| E9 | $LiFePO_4$ | $LiV_2O_4$ | acetic acid buffer solution | 5.0 | $LiNO_3$ (6M) |
| E10 | $LiFePO_4$ | $LiV_2O_4$ | phthalic acid buffer solution | 4.0 | $LiNO_3$ (6M) |
| E11 | $LiFePO_4$ | $LiV_2O_4$ | succinic acid buffer solution | 5.0 | $LiNO_3$ (6M) |
| E12 | $LiFePO_4$ | $LiV_2O_4$ | boric acid buffer solution | 9.2 | $LiNO_3$ (6M) |
| E13 | $LiFePO_4$ | $LiV_2O_4$ | ammonium bicarbonate buffer solution | 8.6 | $LiNO_3$ (6M) |
| E14 | $LiMn_2O_4$ | $LiV_2O_4$ | acetic acid buffer solution | 5.0 | $LiNO_3$ (6M) |
| E15 | $LiNi_{0.33}Co_{0.33}Mn_{0.33}O_2$ | $LiV_2O_4$ | acetic acid buffer solution | 5.0 | $LiNO_3$ (6M) |
| E16 | $LiFePO_4$ | $TiP_2O_7$ | acetic acid buffer solution | 5.0 | $LiNO_3$ (6M) |
| C5 | $LiFePO_4$ | $LiV_2O_4$ | — | — | $LiNO_3$ (6M) |
| C6 | $LiMn_2O_4$ | $LiV_2O_4$ | — | — | $LiNO_3$ (6M) |
| C7 | $LiNi_{0.33}Co_{0.33}Mn_{0.33}O_2$ | $LiV_2O_4$ | — | — | $LiNO_3$ (6M) |
| C8 | $LiFePO_4$ | $TiP_2O_7$ | — | — | $LiNO_3$ (6M) |

Next, as in the case of Example 1, the manufactured batteries (batteries E9 to E16 and batteries C5 to C8) were charged and discharged to measure their service capacity (initial capacity) and, further, subjected to the charge-and-discharge cycle test to check on their post-cycle test capacity conservation ratio. In the present example, they were charged and discharged 100 times and 200 times respectively, to measure the 100th cycle and the 200th cycle capacity conservation ratios.

Further, as in the case of Example 1, a variation in pH value of the aqueous electrolyte solution before and after the and after the charge-and-discharge cycle test was checked for each of the batteries.

The color of the aqueous electrolyte solution for each of the batteries before the charge-and-discharge cycle test was observed by performing visual inspection on the color thereof when the battery was manufactured. In addition, the color of the aqueous electrolyte solution for each of the batteries after the charge-and-discharge cycle test (at the 100th cycle and the 200th cycles was observed by performing visual inspection on the color thereof when the pH value was measured as described above. The results are shown in Table 4 below.

TABLE 4

| battery No. | initial capacity (mAh) | capacity conservation ratio of the 100th cycle (%) | capacity conservation ratio of the 200th cycle (%) | change of pH value | | | color of the aqueous electrolyte solution after 100 cycle | color of the aqueous electrolyte solution after 200 cycle |
|---|---|---|---|---|---|---|---|---|
| | | | | before cycle | after 100th cycle | after 200th cycle | | |
| E9 | 298.3 | 98.4 | 85.3 | 4.70 | 4.76 | 4.81 | clear | clear |
| E10 | 293.2 | 85.6 | 73.7 | 3.97 | 3.99 | 4.02 | clear | clear |

TABLE 4-continued

| battery No. | initial capacity (mAh) | capacity conservation ratio of the 100th cycle (%) | capacity conservation ratio of the 200th cycle (%) | change of pH value before cycle | change of pH value after 100th cycle | change of pH value after 200th cycle | color of the aqueous electrolyte solution after 100 cycle | color of the aqueous electrolyte solution after 200 cycle |
|---|---|---|---|---|---|---|---|---|
| E11 | 293.8 | 88.4 | 76.8 | 5.12 | 5.14 | 5.12 | clear | clear |
| E12 | 284.9 | 82.8 | 63.4 | 8.91 | 8.62 | 8.55 | clear | clear |
| E13 | 297.6 | 81.5 | 64.3 | 7.60 | 7.61 | 7.41 | clear | clear |
| E14 | 195.8 | 78.2 | 58.4 | 4.70 | 4.68 | 4.65 | clear | clear |
| E15 | 183.7 | 80.4 | 55.3 | 4.70 | 4.73 | 4.77 | clear | clear |
| E16 | 178.6 | 90.6 | 78.3 | 4.70 | 4.71 | 4.70 | clear | clear |
| C5 | 305.9 | 81.3 | 45.6 | 4.65 | 2.48 | 2.35 | yellow | yellow |
| C6 | 210.2 | 35.6 | 25.3 | 4.65 | 2.99 | 2.94 | black | black |
| C7 | 188.6 | 40.3 | 31.4 | 4.65 | 6.83 | 7.05 | yellow | yellow |
| C8 | 185.3 | 38.6 | 35.9 | 4.65 | 6.69 | 7.15 | clear | clear |

As can be seen from Table 4, in the batteries E9 to E16 using the pH buffer solution, the variation in pH value of the aqueous electrolyte solution was controlled to 0.5 or less even after the charge-and-discharge operation was performed 100 cycles and 200 cycles. In contrast, the batteries C5 to C8 showed a large decrease in pH value. Further, as can be seen from comparison between the similarly constituted batteries E9 to E13 and C5, batteries E14 and C6, batteries E15 and C7, and batteries E16 and C8 respectively, the batteries E9 to E16 in which the variation in pH value was controlled improved in capacity conservation ratio while maintaining almost the same degree of initial capacity as compared to the batteries C5 to C8 in which the pH value changed greatly before and after the charge-and-discharge cycle test.

In particular, the battery (battery E9) using the acetic acid buffer solution containing potassium acetate and acetic acid is found to be very high in capacity conservation ratio and remarkably excellent in cycle characteristics as compared to the batteries (batteries E10 to E13) using any other buffer solutions.

Further, in the batteries E9 to E16, the color of the aqueous electrolyte solution did not change and remained clear after the charge-and-discharge cycle test, whereas the batteries C5 to C7 colored after the charge-and-discharge cycle test. Therefore, it is considered that as in the case of Example 1, the pH value of the aqueous electrolyte solution changed greatly in the samples C5 to C7, to elute the metal ions and impurities etc. into the electrolyte solution from the positive electrode active material and/or the negative electrode active material etc.

It is thus known that by employing a buffer solution, a variation in pH value in the aqueous solution of the water based lithium secondary battery can be inhibited sufficiently at the time of charging and discharging, thus improving the capacity conservation ratio.

In the present example, the cylindrical battery has been employed, in which case also it is known that a variation in pH value can be inhibited by employing the buffer solution. It can thus be understood that irrespective of the shape of the batteries, the employment of a buffer solution is very effective in inhibition of the variation in pH value, thereby improving the capacity conservation ratio.

The invention claimed is:

1. A water based lithium secondary battery comprising:
a positive electrode;
a negative electrode; and
an aqueous electrolyte solution obtained by dissolving an electrolyte made of a lithium salt in a pH buffer solution containing a potassium salt,
wherein a variation in pH value of the aqueous electrolyte solution after a charge-and-discharge operation is repeated 20 cycles at a temperature of 20° C. is controlled to ±0.5 or less.

2. The water based lithium secondary battery according to claim 1, wherein the variation in pH value of the aqueous electrolyte solution after the charge-and-discharge operation is repeated 200 cycles at the temperature of 20° C. is controlled to ±0.5 or less.

3. The water based lithium secondary battery according to claim 1, wherein the buffer solution is obtained by dissolving an acid and its conjugate base's salt, a base and its conjugate acid's salt, a salt made from a weak acid and a strong base, a salt made from a weak base and a strong acid, or a salt made from a weak acid and a weak base in water.

4. The water based lithium secondary battery according to claim 1, wherein the buffer solution contains potassium acetate and acetic acid.

5. The water based lithium secondary battery according to claim 4, wherein a mixture ratio between potassium acetate and acetic acid in the buffer solution is, in mol ratio, 7 to 9:3 to 1 (potassium acetate:acetic acid).

6. The water based lithium secondary battery according to claim 1, wherein the aqueous electrolyte solution has a pH value of 3 to 11 at the temperature of 25° C.

7. The water based lithium secondary battery according to claim 1, wherein the lithium salt is lithium nitrate.

8. The water based lithium secondary battery according to claim 1, wherein a concentration of the lithium salt as the electrolyte in the aqueous electrolyte solution is not smaller than 0.1 mol/l and not larger than a saturation concentration.

9. The water based lithium secondary battery according to claim 1, wherein the positive electrode has a olivine-structured compound having a basic composition of $LiFePO_4$ as its positive electrode active material.

10. The water based lithium secondary battery according to claim 1, wherein the negative electrode has a spinel-structured compound having a basic composition of $LiV_2O_4$ as its negative electrode active material.

* * * * *